United States Patent
Basu et al.

(10) Patent No.: US 7,529,196 B2
(45) Date of Patent: May 5, 2009

(54) ROUTING A SERVICE QUERY IN AN OVERLAY NETWORK

(75) Inventors: Sujoy Basu, Menlo Park, CA (US);
Sujata Banerjee, Sunnyvale, CA (US);
Puneet Sharma, Palo Alto, CA (US);
Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 11/006,041

(22) Filed: Dec. 7, 2004

(65) Prior Publication Data

US 2007/0115844 A1  May 24, 2007

(51) Int. Cl.
*H04L 12/28* (2006.01)
(52) U.S. Cl. ............... 370/254; 370/255; 370/351; 709/238
(58) Field of Classification Search ............ None
See application file for complete search history.

(56) References Cited

U.S. PATENT DOCUMENTS 6,308,216 B1   10/2001  Goldszmidt
2004/0044727 A1*  3/2004  Abdelaziz et al. ........... 709/203
2004/0210670 A1   10/2004  Anerousis et al.

OTHER PUBLICATIONS

Ganesan, Prasanna et al; "One Torus to Rule them All: Multi-Dimensional Queries in P2P Systems"; Jun. 17-18, 2004; Seventh International Workshop on the Web and Databases; WebDB 2004; pp. 1-6.*
Andrezejak, A. et al., "Scalabe, Efficient Range Queries for Grid Information Services", HP Labs Technical Report HPL-2002-209, Jul 2002.
Balazinska, M. et al, "Twine: A Scalabe Peer-to-Peer Architecture for Intentional Resource Discovery", Lecture Notes in Computer Science, 2002.
Czajkowski, K. et al., "Grid Information Services for Distributed Resource Sharing", Proc. 10th IEEE International Symposium on High Performance Distributed Computing, 2001.
Ganesan, P. et al., "One Torus to Rule Them All: Multi-Dimensional Quereis in PSP Systems", Stanford University; 2004.
Iamnitchi, A. et al., "A Peer-to-Peer Approach to Resource Location in Grid Environments", Univ. of Chicago Technical Report TR-2002-06, 2002.
Oppenheimer, D. et al. "Scalable Wide-Area Resource Discovery", Univ. of California, Berkely, San Diego; downloaded 2004, http://www.cs.berkely.edu/~davidopp/sword/; downloaded 2004.

* cited by examiner

*Primary Examiner*—Wing F Chan
*Assistant Examiner*—Robert C Scheibel (57) ABSTRACT

A query including a plurality of attributes and attribute values for a desired service is received. The query is routed to a destination in the overlay network using different attributes in the query.

26 Claims, 10 Drawing Sheets

ROUTING A SERVICE QUERY IN AN OVERLAY NETWORK

TECHNICAL FIELD

This invention relates generally to networks. More particularly, the invention relates to routing a service query in an overlay network.

BACKGROUND

Large networks, such as the Internet, which may provide the infrastructure for many peer-to-peer systems, are now being used to provide a variety of services to users. For example, media services, such as streaming and transcoding, web-services for e-commerce, such as airline and hotel reservations, or grid computing services for computation and data may be available via large networks.

A fundamental challenge in effectively utilizing these network services is to efficiently and quickly locate desired services in large networks, such as the Internet. The challenge of discovering services is complicated by several factors. For example, if a centralized information service for facilitating such discovery were used, such as a centralized information service used for peer-to-peer file sharing systems, it would not easily scale as the number of available services and number of users increases. In addition, each service has several dynamic attributes, e.g., load and latency, that keep changing and need to be updated in the information service. The desired update rate may not be sustained by a centralized information service. Also, providing an information service with minimal downtime may require several system administrators to maintain and would be costly. Finally, the information service should be locality-aware for faster response times. For example, a query including a request for a desired service should be directed to a node in the network proximity of the node initially sending the query, and the services returned as a response to the query should also be in the network proximity of the querying node.

SUMMARY

According to an embodiment, a query including a plurality of attributes and attribute values for a desired service is received. The query is routed to a destination in the overlay network using different attributes in the query.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a distributed information service is provided for discovering services in a network. The information service provides users with information about services available via the network. A user queries the information service for information about desired services available via the network. The information service may respond with a list of service nodes in the network that are operable to provide the desired service.

The information service is a distributed information service including a plurality of information service nodes in a peer-to-peer network storing information about the available services. The information service is a distributed information service including a plurality of information service nodes in a peer-to-peer network storing information about the available services. Unlike conventional peer-to-peer networks where the nodes tend to be transient, the information service nodes are stable nodes in a peer-to-peer architecture that are more likely to remain in the peer-to-peer network for an extended period of time rather than joining the peer-to-peer network for a short period of time. It will be apparent to one of ordinary skill in the art that the peer-to-peer network is one example of organizing the information service nodes in a distributed architecture and any type of distributed architecture may be used.

The distributed nature of the information service minimizes the bottleneck associated with using a conventional, central information repository that handles all queries for information, and thus improves query response times. An overlay network for the peer-to-peer network is used to efficiently route queries and information about services in the distributed information service for facilitating the discovery of available services in a network.

A service as used herein refers to any function that operates on an input and produces an output. Examples of services include transcoding, language translation, encryption, image repair and analysis, error correction, converting content into different languages, etc. Also, a service may be composed of multiple services. For example, an output of one service may be the input of another service, and so on for as many intermediate services that are used to compose the service. An example of a composed service may include a media service including a video streaming service input into a transcoding service such that a user may receive streaming video in a format viewable on a particular end-user device.

Other types of services include computation services, data storage services, and grid computing services, which may encompass sharing of computer resources. A grid computing service, for example, allows users access to computing services based on specifications, such as application requirements.

1. System Overview

Figure 1:
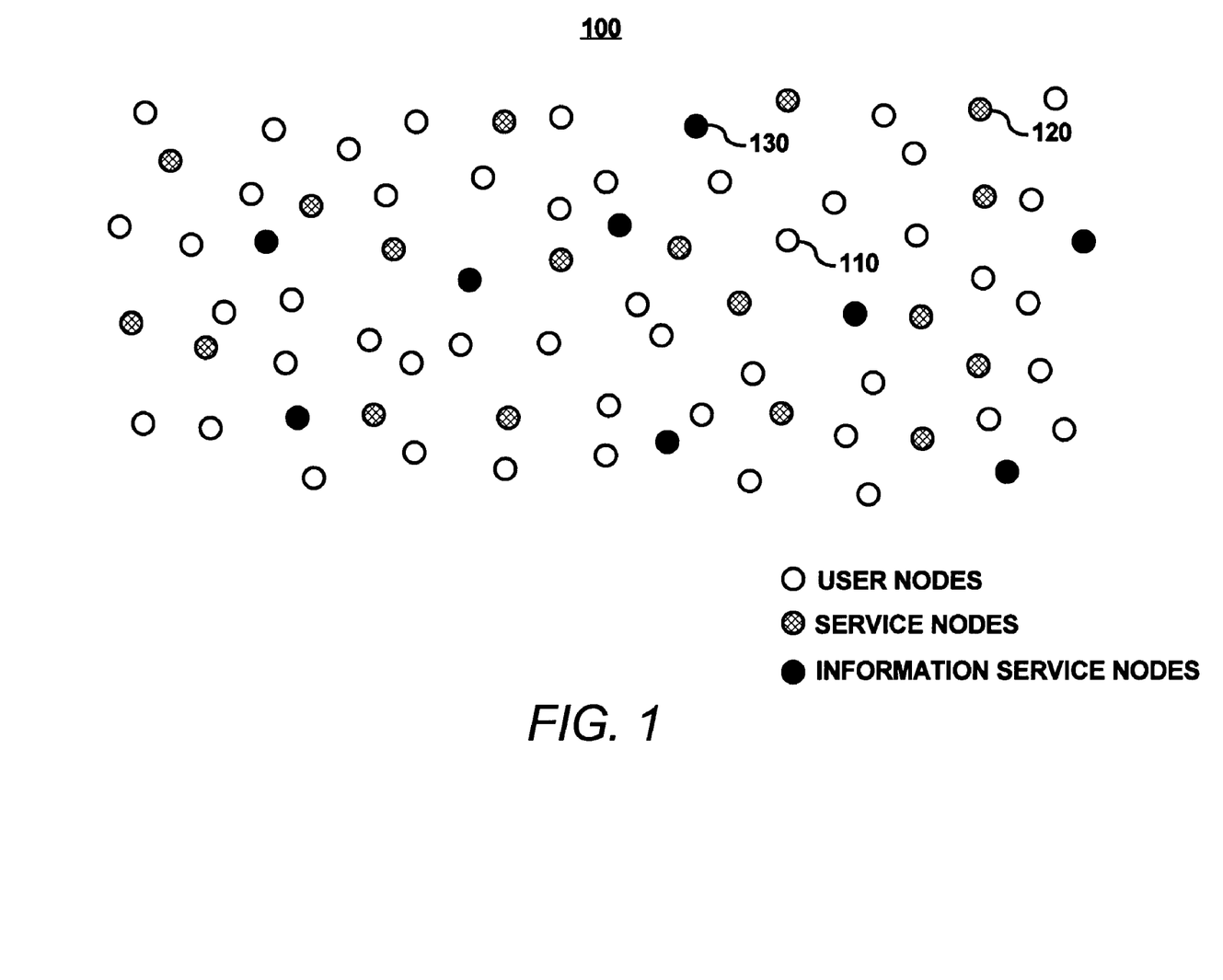
FIG. 1 illustrates a peer-to-peer network, according to an embodiment.

FIG. 1 illustrates a network 100 including user nodes 110, service nodes 120, and information service nodes 130. An example of the network 100 includes a large-scale network, such as the Internet, where services are made available to users. However, the embodiments may be implemented in smaller networks providing services. User nodes include any node operable to receive a service. Typically, a user node submits a query to an information service for determining whether a service desired by a user is available in the network 100, and if the service is available, which service node to contact for receiving the service. The service nodes 120 include nodes operable to provide services. After a user node identifies a service node operable to provide a desired service by querying the information service, the user node receives the service from the service node providing the desired service. A node is any device that may send and/or receive messages via the network and that is typically operable to perform some type of data processing. Examples of nodes include routers, servers, and end-user devices, such as PDA'S, personal computers, laptops, and cellular phones.

The information service, according to an embodiment, is provided by the information service nodes 130. The information service nodes 130 allow for the discovery of services in the network 100. Two important functions of the information service include the storing of information about available services and responding to queries about available services.

Figure 2:
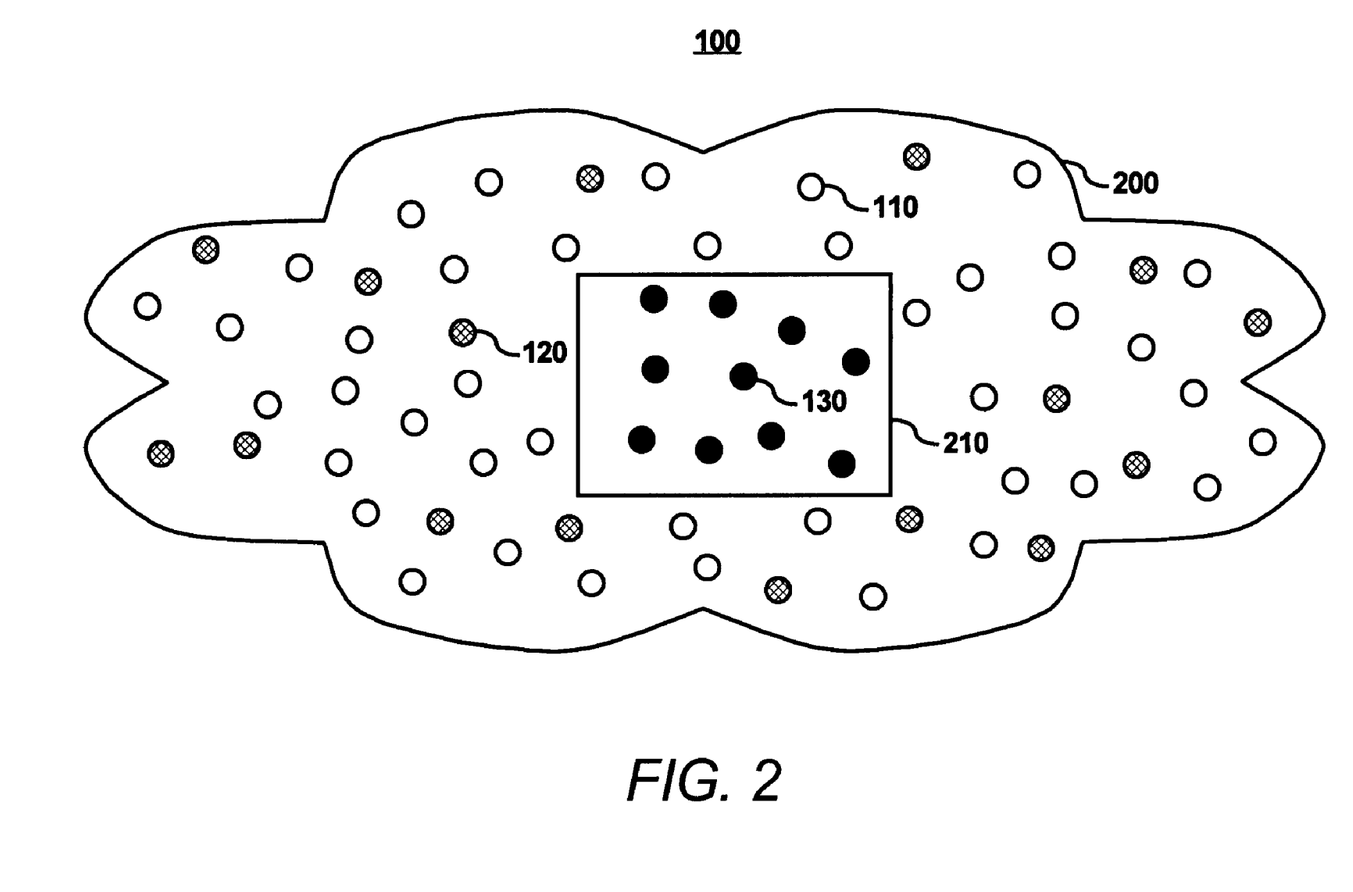
FIG. 2 illustrates an overlay network in the peer-to-peer network, according to an embodiment.

The information service nodes 130 are provided in a peer-to-peer network 200, shown in FIG. 2, in the network 100. The peer-to-peer network 200 and an overlay network 210 for the peer-to-peer network 200 are used for, among other things, storing information about services in the information service nodes 130, for routing among the information service nodes 130, and for responding to queries.

As shown in FIG. 2, the overlay network 210 overlays the underlying peer-to-peer network 200. The overlay network 210 is a logical representation of the peer-to-peer network 200 and is operable to efficiently route queries and service information based on attributes and attribute ranges used to define services, as described in detail below. FIG. 2 illustrates the information service nodes 130 centrally located in the network 100 and the user nodes 110 and the service nodes 120 provided around the overlay network 210 for purposes of illustrating that the peer-to-peer network 200 includes the information service nodes 130 and that the user nodes 110 and the service nodes 120 communicate with the information service nodes 130 in the peer-to-peer network 200 as needed. The information service nodes 130 may be provided in several different areas of the network 100 to minimize latency, e.g., the length of time it takes a user node to get a response to a query response.

In addition to service discovery, the information service nodes 130 balance workloads among themselves using several techniques described in co-pending U.S. patent application Ser. No. 11/006,061 entitled "Splitting Workload Of A Node" by Sujoy Basu et al., and copending U.S. patent application Ser. No. 11/006,068 entitled "Determining Highest Workloads For Nodes In A Network" by Sujoy Basu et al., both of which are incorporated by reference in their entireties. In these applications, an information service node having the highest workload is identified and may be selected for workload splitting. According to another embodiment, workload balancing may be achieved on an individualized node basis. For example, assume a set of one or more nodes in the network 100 have been determined by an admission control process to be nodes suitable for the information service. Each of the information service nodes 130 in the overlay network 210 periodically calculates their workload. If a workload is greater than a threshold, than the corresponding information service node invites one of the nodes in the set to join the information service and the information service node splits its workload with the new node invited to join the information service. The new node may include a node in the set in close network proximity to the information service node with the heavy workload. Also, an information service node previously added may be removed from the information service if its workload falls below a threshold.

2. The Attribute Space and Attribute Subspaces

A service is characterized by specifying values for various service attributes. For example, a computing service may be characterized by the values of attributes, such as operating system and applications, amount of physical memory, disk space, and network bandwidth.

The information service tracks these attributes and attribute values. Each information service node has the responsibility for tracking a certain set of values for one or more of the attributes. The combination of the sets of attribute values for all the tracked attributes forms the attribute subspace tracked by that information service node.

Figure 3:
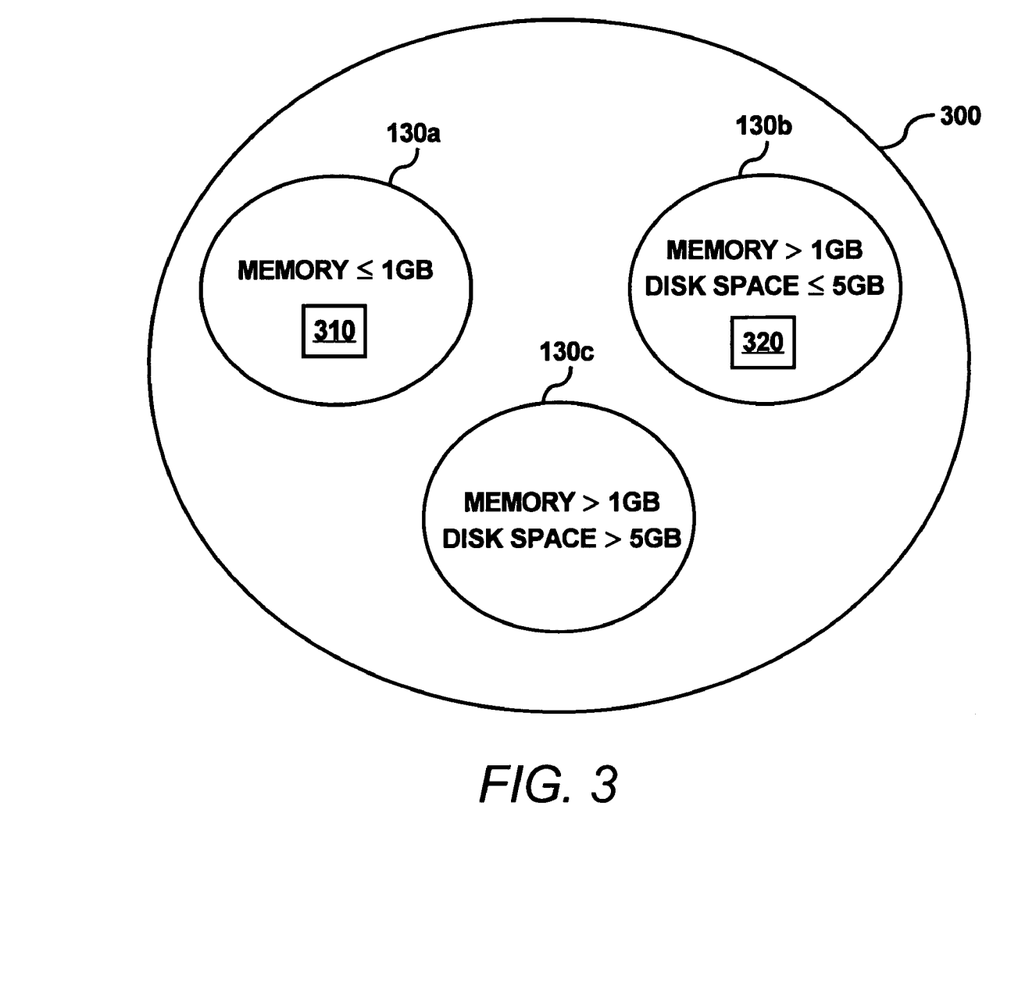
FIG. 3 illustrates an attribute space and attribute subspaces, according to an embodiment.

The information service, comprised of the information service nodes 130, includes an attribute space 300 shown in FIG. 3. The attribute space 300 includes all the information about available services in the peer-to-peer network 100. The attribute space 300 is a logical representation of the information stored in the information service.

The attribute space 300 is distributed among the information service nodes 130. Only three information service nodes 130a-c are shown in FIG. 3 for purposes of illustration. Each of the information service nodes 130 is assigned responsibility for an attribute subspace in the attribute space 300. Each attribute subspace is associated with particular attributes and attribute values. In the information service, a service is defined by predetermined attributes and attribute values that vary by service. Attributes and attribute values are assigned to each of the information service nodes 130. A service is determined to fall within an attribute subspace of an information service node, and thus information about that service is ultimately stored in that information service node, if the attributes and attribute values for the service match the attributes and attribute values assigned to the attribute subspace for the information service node. For example, an attribute subspace may include attribute values for a particular attribute. If a service is defined using one or more attribute values that intersect the attribute values of an attribute subspace, the service may fall within the attribute subspace. An example further describing the attribute subspaces is as follows. A list of predetermined attributes for defining all the services in the network 100 may include memory, disk space, average load, operating system, applications, service uptime, and response time. A grid computing service may include the sharing of computer resources. A grid computing service, e.g., grid computing service 1, may be defined based on the computer resources that can be shared. Grid computing service 1 is defined using the following attribute values:

Table 1 of Attributes and Attribute Values for Grid Computing Service 1

| Table 1 of Attributes and Attribute Values for Grid Computing Service 1 |
| --- |
| Memory: 1 GB |
| Disk Space: 2.5-5 GB |
| Operating System: Linux 2.4 |
| Average Load: 0 |
| Applications: Maya, Renderman |
| Service Uptime: 99.5% |
| Response Time: <=20 ms |

As shown in FIG. 3, the information service node 130*a* is assigned the attribute subspace defined by the attribute values of memory <=1 GB. An advertisement 310 for the grid computing service 1, which includes the attribute values in Table 1, is stored at the information service node 130*a* because the information service node 130*a* stores all advertisements having a memory attribute value <=1 GB.

An advertisement includes the attributes and attribute values used to define a particular service. A predetermined set of attributes may be used to define all services in the network 100. Each of the service nodes 120 measures or otherwise determines the attribute values for each of the attributes in the predetermined set of attributes. Each of the service nodes 120 also periodically sends their advertisements to the information service. The overlay network 210 automatically routes the advertisements to the appropriate information service node owning the attribute subspace where the advertisement falls. The attributes and attribute values shown above for the grid computing service 1 is an example of the information in the advertisement 130 for the grid computing service 1. For example, a service node providing the grid computing service 1 periodically measures or otherwise determines the attribute values for the grid computing service 1 shown in Table 1 and transmits the advertisement 310 including the attribute values to the overlay network 210 for storage in the information service node owning the attribute subspace where the advertisement falls. In the example shown in FIG. 3, the information service nodes 130 routed an advertisement 310 for the grid computing service 1 to the information service node 130*a*, because the information service node 130*a* stores all the information about services, transmitted to the overlay network 210, having an attribute value within memory <=1 GB. That is the grid computing service 1 is defined using an attribute value of 1 GB for the memory =attribute, and the 1 GB attribute value intersects, i.e., is included in the attribute range of memory <=1 GB for the attribute subspace of the information service node 130*a*. Thus, the grid computing service 1 falls within the attribute subspace of the information service node 130*a*.

The attributes shown above for the grid computing service 1 are examples of the predetermined set of attributes used to define services in the network 100. It will be apparent to one of ordinary skill in the art that other attributes may be used to define the available services. Also, a predetermined set of attributes may be used to define the services. However, each service may have different attribute values, which are periodically measured and stored in the information service node having the corresponding attribute subspace.

Queries are similarly stored in the peer-to-peer network 200. For example, the overlay network 210 shown in FIG. 2 may receive a query 320 shown in FIG. 3 including a request for a service with an attribute of memory >1 GB and disk space =2 GB. The query 320 falls in the attribute subspace owned by the information service node 130*b*. Thus, the query 320 is routed through the overlay network 210 to the information service node 130*b*. The query 320 is automatically routed to and stored in the information service node 130*b*, and the information service node 130*b* responds to the query by searching the advertisements stored in the information service node 130*b* and sending any matches to the node requesting the service.

The overlay network 210, including the attribute space 300, supports range queries. Range queries include one or more attribute ranges that identify a desired service. The information service nodes 130, using the overlay network 210, are operable to route range queries to an attribute subspace including the range of attribute values or an attribute subspace intersecting the range of attribute values in the query. In addition, the query may include multiple attribute ranges, and the query may be routed to more than one information service node having an attribute subspace including or intersecting an attribute range.

3. Information Service Node

Figure 4:
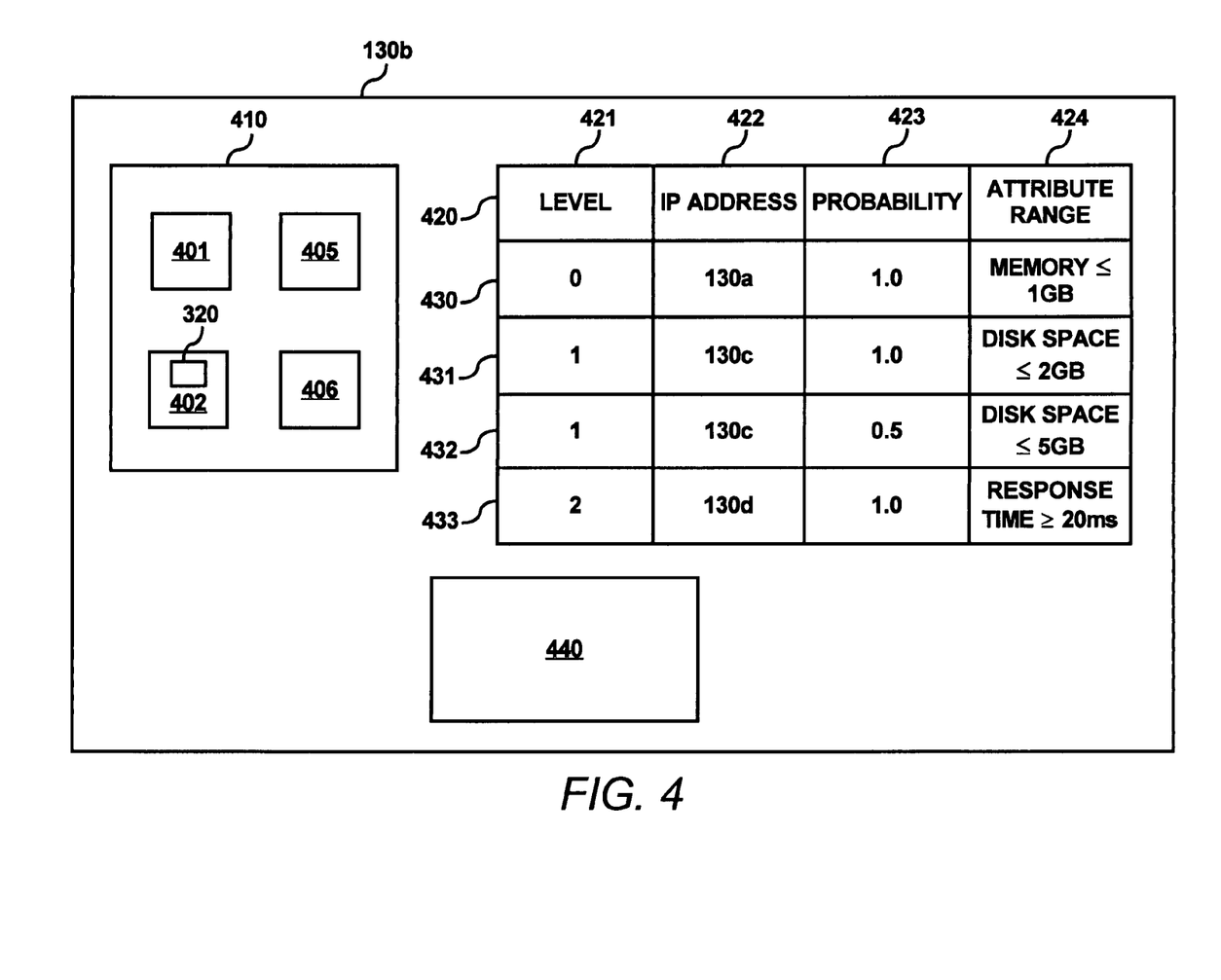
FIG. 4 illustrates information stored in an information service node, according to an embodiment.

FIG. 4 illustrates an example of some of the information stored in an information service node, such as the information service node 130*b*. The information service node 130*b* includes a storage cache 410, an overlay routing table 420, and a replica location cache 440. The storage cache 410 stores local queries 401 and global queries 402. The storage cache 410 also stores local advertisements 405 and global advertisements 406. The global queries 402 include queries that are routed through the overlay network 210 to the information service node 130*b*, because the queries fall in the attribute subspace owned by the information storage node 130*b*. The query 320 shown in FIG. 3 is an example of a global query.

The local queries 401 include any query received by the information service node 130*b*. For example, the information service node 130*a* may receive a query and forward the query towards its destination in the overlay network 210, which may include the information service node owning the attribute subspace where the query falls. Before forwarding the query toward its destination, the query is locally cached in the storage cache 410. Also, the information service node 130*b*, before forwarding the query towards its destination, searches the local advertisements 405 stored in the storage cache 410 to determine whether any matches to the query are found. If a match is found, the information service node 130*b* responds to the query, for example, by sending the matching advertisement to the node requesting the service and the associated service node. The information service node 130*b* may continue to route the query toward its destination, because the destination may include advertisements for services matching the query that are provided by service nodes closer to the node requesting the service. Alternatively, the information service node 130*b* may not forward the query if a match is locally cached.

The global advertisements 406 include advertisements that are routed through the overlay network 210 to the information service node 130*b*, because the advertisements fall in the attribute subspace owned by the information storage node 130*b*. The advertisement 310 shown in FIG. 3 is an example of a global advertisement for the information service node 130*a*.

The local advertisements 405 include any advertisement received by the information service node 130*a*. For example, the information service node 130*a* may receive an advertisement and forward the advertisement towards its destination. These advertisements are locally cached in the storage cache 410 and may be searched to provide faster response times for queries if matches are found in the local cache.

The information service node 130b also includes the overlay routing table 420. The overlay routing table 420 includes the following fields: level 421, IP address 422, probability 423, and attribute range 424. The level 421 is generally associated with the number of times the information service node 130b has split its workload with another information service node. When the information service node 130b splits its workload with another information service node, a new entry in the routing table in the information service node 130b is created at a level greater than the existing highest level in the routing table. For example, the entries 431 and 432 were created at level 1 when the information service node 130b split its workload with the information service node 130c. The entry 433 was created at level 2 when the information service node 130b subsequently split its workload with the information service node 130d. Workload splitting may be performed when a determination is made that an information service node has a high workload in comparison to other information service nodes in the overlay network 210. The probabilities 423 indicates the probability that an information service node will have the desired data. For example, the entry 430 indicates that the information service node 130a always stores advertisements with memory <=1 GB, and the entry 431 indicates that the information service node 130c always stores advertisements with disk space <=2GB. However, the information service node 130c has a 50% probability of storing advertisements with disk space <=5GB. Generating the entries in the routing tables and the probabilities are described in further detail in the U.S. patent applications incorporated by reference above.

The IP address field 422 in the routing table 420 is for identifying the destination of an information service node in a particular entry. For example, if the information service node 130b receives an advertisement and determines the advertisement has a memory attribute <1 GB, the information service node 130b uses the entry 430 to route the advertisement to its next destination, e.g., the information service node 130a. The IP address of the information service node 130a may be provided in the IP address field of the entry 430, and the information service node 130b uses IP routing to transmit the message to the information service node 130a in the network 200.

The replica location cache 440 stores information associated with the number of times each service node is contacted and latencies for the service nodes that have been contacted. A replica is a copy of an information service node. For example, an information service node may be duplicated at a new location in the network 100 if it is determined that the original information service node has been contacted frequently by user nodes in one area of the network 100 and/or user nodes receiving messages, such as responses to queries, from the original information service node have been experiencing high latencies to the information service node. The information service node 130b may use the information in the replica location cache 440 to determine whether to add a replica in another area of the network 100 to reduce latency.

4. Routing

Figure 5:
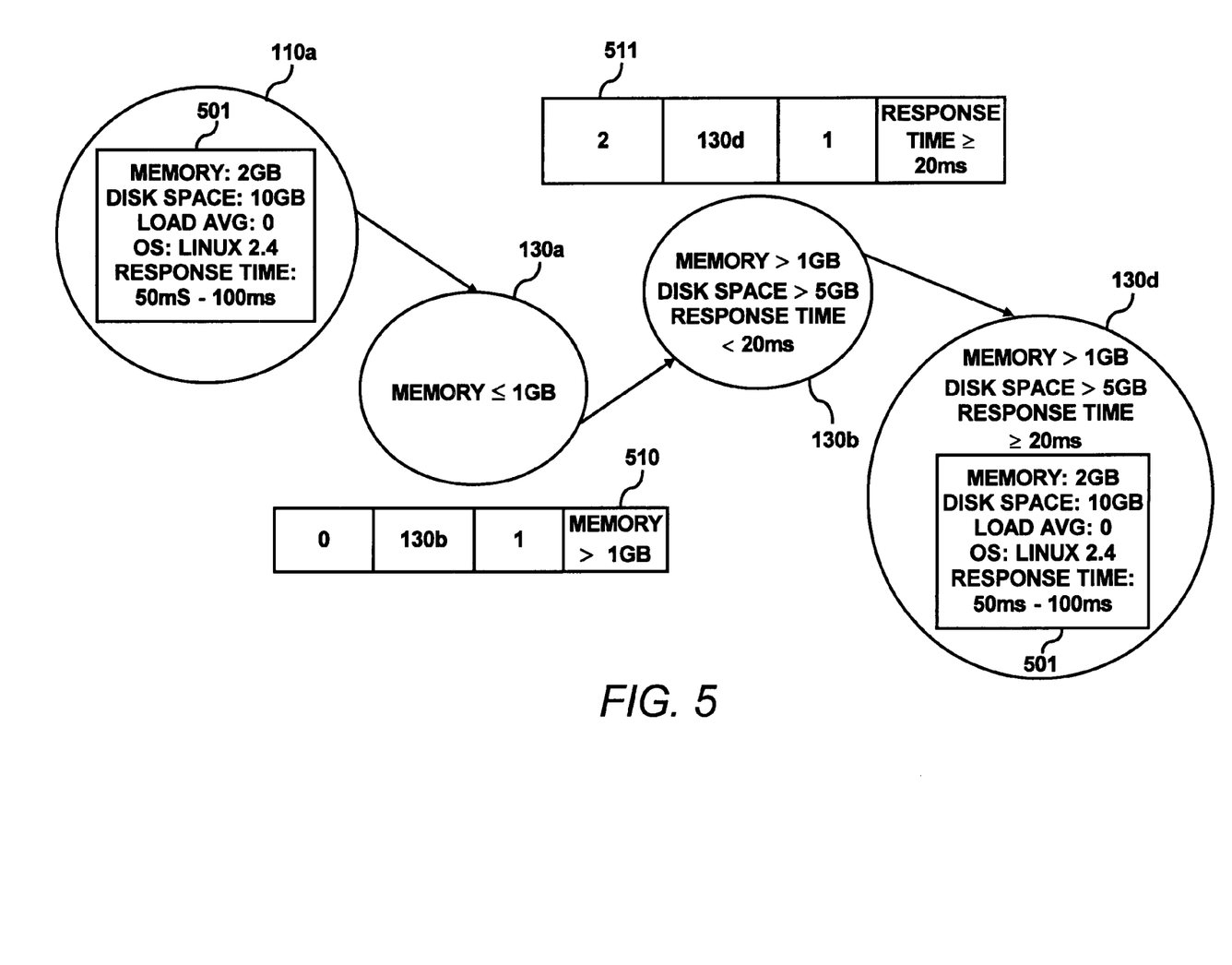
FIG. 5 illustrates routing a query, according to an embodiment.

FIG. 5 illustrates an example of routing a query 501 in the overlay network 210. A user node 110a transmits the query 501 to an information service node, e.g., the information service node 130a, in the overlay network 210. In one example, the information service node that the user node 110a makes initial contact with in the overlay network 210 may be selected based on network proximity. For example, during an initialization step when the user node 110a joins the peer-to-peer network 100, the user node 110a receives a message from an information service node indicating the IP address of the information service node in close network proximity to the user node 110a. An example of determining location information for nodes using distances measured based on a network metric, such as latency, number of hops, etc. is described in U.S. patent application Ser. No. 10/767,285, filed Jan. 30, 2004, and entitled "Selecting Nodes Close To Another Node In A Network Using Location Information For The Nodes" by Zhichen Xu et al., which is assigned to the assignee of the present application. The location information is used to determine network proximity to other nodes in the network and can be used to select a closest information service node. Other techniques for determining distances and location information for nodes in a network may also be used.

After the user node 110a identifies an information service node in close proximity, e.g., the information service node 130a, the user node 110b transmits the query 501 to the information service node 130a. The query 501 includes attribute values defining a service desired by the user node 110a. The attribute values may be a range or a single value. In this example, the query 501 includes the following attribute values:

Table 2 of the Attributes and Attribute Values for the Query 501

| Table 2 of the Attributes and Attribute Values for the Query 501 |
| --- |
| Memory: 2 GB |
| Disk Space: 10 GB |
| Operating System: Linux 2.4 |
| Response Time: 50-100 ms |

The information service node 130i a receives the query 501. The attribute subspace for the information service node 130a includes memory <=1 GB. The query 501 includes an attribute value of 2 GB for memory. The 2 GB attribute value is not included in the attribute range of memory <=1 GB for the attribute subspace of the information service node 130a, and thus the query 501 does not fall in the attribute subspace of the information service node 130a.

The information service node 130a identifies an information service node from its routing table that includes the attribute values of the query 501. For example, the information service node 130a starts with the lowest level entry, e.g., level 0, and searches its routing table for an entry including attribute values that intersect the attribute values in the query 501. An entry 510 is shown which includes: level 0, IP address for the information service node 130b, probability of 1, and memory >1 GB. Based on the entry 510, the information service node 130a transmits the query 501 to the information service node 130b. The attribute subspace for the information service node 130b includes response time <20 ms which is not included in the response time range of 50-100 ms specified in the query 501. Thus, the information service node 130d searches its routing table and finds, for example, the entry 511. The entry 511 identifies the information service node 130d and the query 501 is transmitted to the information service node 130d. The information service node 130d has an attribute subspace including the attribute values of the query 501, and thus the query 501 falls in that attribute subspace. The information service node 130a determines whether any advertisements stored in its global cache satisfy the query. For example, a service may need to have all the attribute values specified in the query 501 for it to be considered a match. If a match is found, the information service node 130a responds to the query 501 by sending the advertisement, including, for example, the IP address of the service node providing the service, to the user node 110a. The information service node 130a may also send a message to the service node for the advertisement, along with the IP address of the user node 110a, indicating that the user node 110a is requesting the service described in the advertisement. The query 501 is also stored in the global cache of the information service node 130c.

The information service nodes 130a and 130b may store a copy of the query 501 in its local cache before forwarding the query 501. Also, the information service nodes 130a and 130b may determine whether any advertisements stored in its local cache satisfy the query 501 before forwarding the query. If a match is found, the information service node 130a may respond to the query 501 by sending the advertisement, including, for example, the IP address of the service node providing the service, to the user node 110a. The information service node 130a may also send a message to the service node providing the service described in the advertisement, along with the IP address of the user node 110a, indicating that the user node 110a is requesting the service in the advertisement.

In the example described above with respect to FIG. 5, the query 501 is routed to the information service node 130d because the query 501 falls in the attribute subspace of the information service node 130d. The query 501 may continue to be routed to other information service nodes that may include advertisements matching the query 501. For example, another information service node may include the following attribute subspace: memory >1 GB, disk space >5 GB, response time >=20 ms, and operating system including Linux 1.0-2.5. The information service node 130d may route the query 501 to the information service node including the attribute subspace described above, because the query 501 also falls in that attribute subspace. Thus, the user node 110a may receive search results from multiple information service nodes, including information service nodes finding matches in their local caches, and the user node 110a may select a service node for receiving the desired service.

In addition, it should be noted that the overlay network 210 supports range queries. The query 501 includes a range of attribute value, 50-100 ms, for the attribute response time. The query 501 may include one or more ranges, and is routed to information service nodes intersecting the range. For example, the query 501 may be routed to an attribute subspace including any of the attribute values 50-100 ms.

Figure 6:
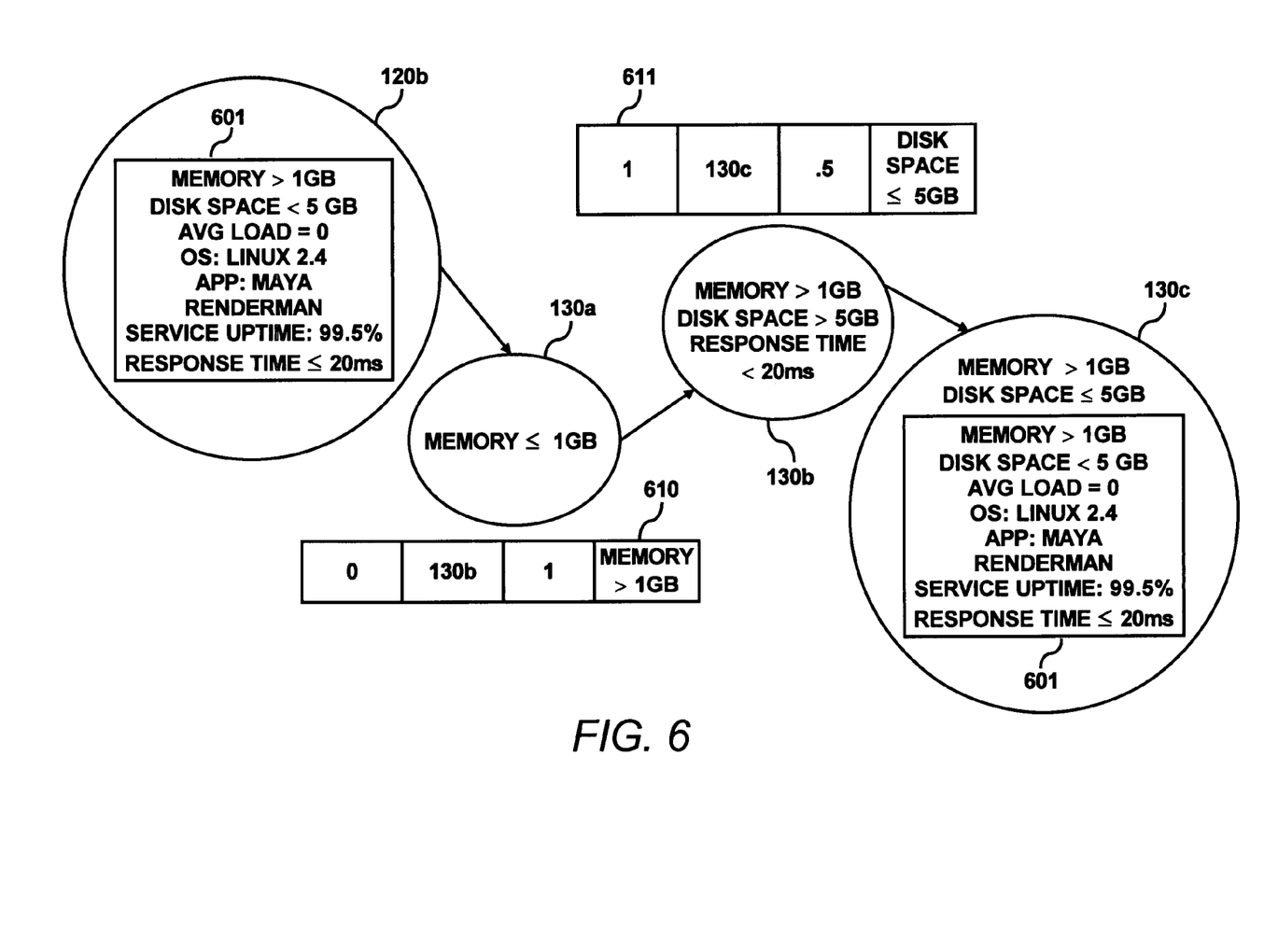
FIG. 6 illustrates routing an advertisement, according to an embodiment.

FIG. 6 illustrates routing an advertisement 601 in the overlay network 210. Advertisements are routed similarly to queries in the overlay network 210. The service nodes 120 periodically measure their attributes and transmit their advertisements including the measured attributes to the overlay network 210. Each advertisement may include an attribute value or a range of attribute values for each attribute in a predetermined set of attributes. An example of a predetermined set of attributes includes memory, disk space, operating system, average load of a service node providing a service, applications, service uptime, and response time of an information service node providing a service.

FIG. 6 illustrates an advertisement 601 generated by the service node 120b. The advertisement 601 includes the following:

table 3 of Attribute Values for the Advertisement 601

| Table 3 of Attribute Values for the Advertisement 601 |
| --- |
| Memory: 1 GB |
| Disk Space: 2.5-5 GB |
| Operating System: Linux 2.4 |
| Average Load: 0 |
| Applications: Maya, Renderman |
| Service Uptime: 99.5% |
| Response Time: <=20 ms |

The service node 120b may transmit the advertisement 601 to the information service node 130a, because, for example, the information service node 130a is in close proximity to the service node 120b. The advertisement 601 does not fall in the attribute subspace owned by the information service node 130a, because the advertisement 601 has memory >1 GB and the attribute subspace for the information service node 130a includes memory <=1 GB. Thus, the information service node 130a identifies the information service node 130b from an entry 610 in its routing table. For example, the information service node 130b starts with the lowest level entry and searches its routing table for an entry including attribute values that intersect attribute values in the advertisement 601. The entry 610 identifies the information service node 130b and the advertisement 601 is transmitted to the information service node 130b. The advertisement 601 does not fall in the attribute subspace owned by the information service node 130b, because the disk space in the advertisement 601 is less than or equal to 5 GB. The information service node 130b identifies the information service node 130c from an entry 611 in its routing table that includes the attribute value of disk space <=5 GB. The advertisement 601 falls in the attribute subspace of the information service node 130c and is stored at the information service node 130c. Prior to forwarding the advertisement 601, the information service nodes 130a and 130b store the advertisement 601 in its local cache. In addition, the information service node 130c may copy the advertisement 601 for storage in its global cache and forward the advertisement 601 to other information service nodes including attribute subspaces where the advertisement 601 falls.

As described in the examples above, a single overlay network, such as the overlay network 210, may be used to route queries and advertisements to a destination. Also, routing an advertisement or a query in the overlay network 210 to a final destination, such as one or more attribute subspaces where the query or advertisement falls, can be performed using more than one attribute in the query or advertisement.

Figure 7:
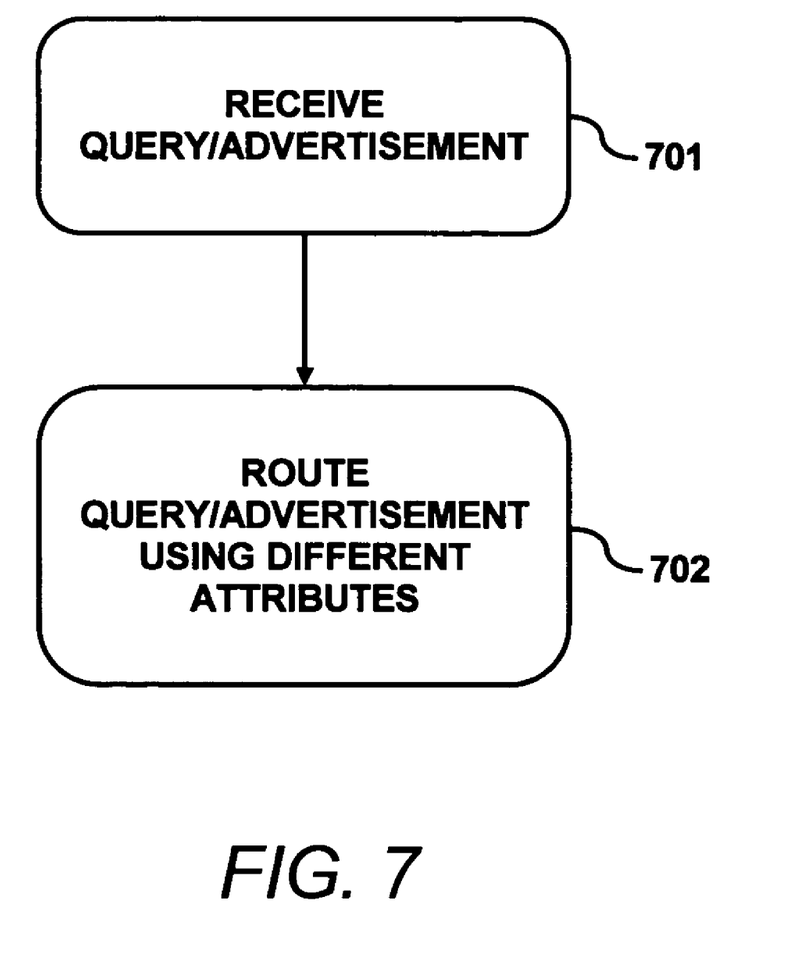
FIG. 7 illustrates a flow chart of a method for routing a query or advertisement, according to an embodiment.

FIG. 7 illustrates a method 700 for routing queries and advertisements in the overlay network 210, according to an embodiment. The queries or advertisements may be referred to as service queries or service advertisements as the queries or advertisements pertain to a requested service or a service available in the network 100. FIG. 7 is described with respect to the examples shown in FIGS. 5 and 6 by way of example and not limitation. At step 701, a query or advertisement is received including a plurality of attributes and attribute values. At step 702, the query or advertisement is routed to a node in the overlay network using different attributes. For example, the query 501 shown in FIG. 5 is routed using the memory attribute for the network hop to 130b. Then, the response time attribute is used to route the query 501 to the information service node 130d. In FIG. 6, the advertisement 601 is also routed using the memory and disk space attributes at different hops.

Figure 8:
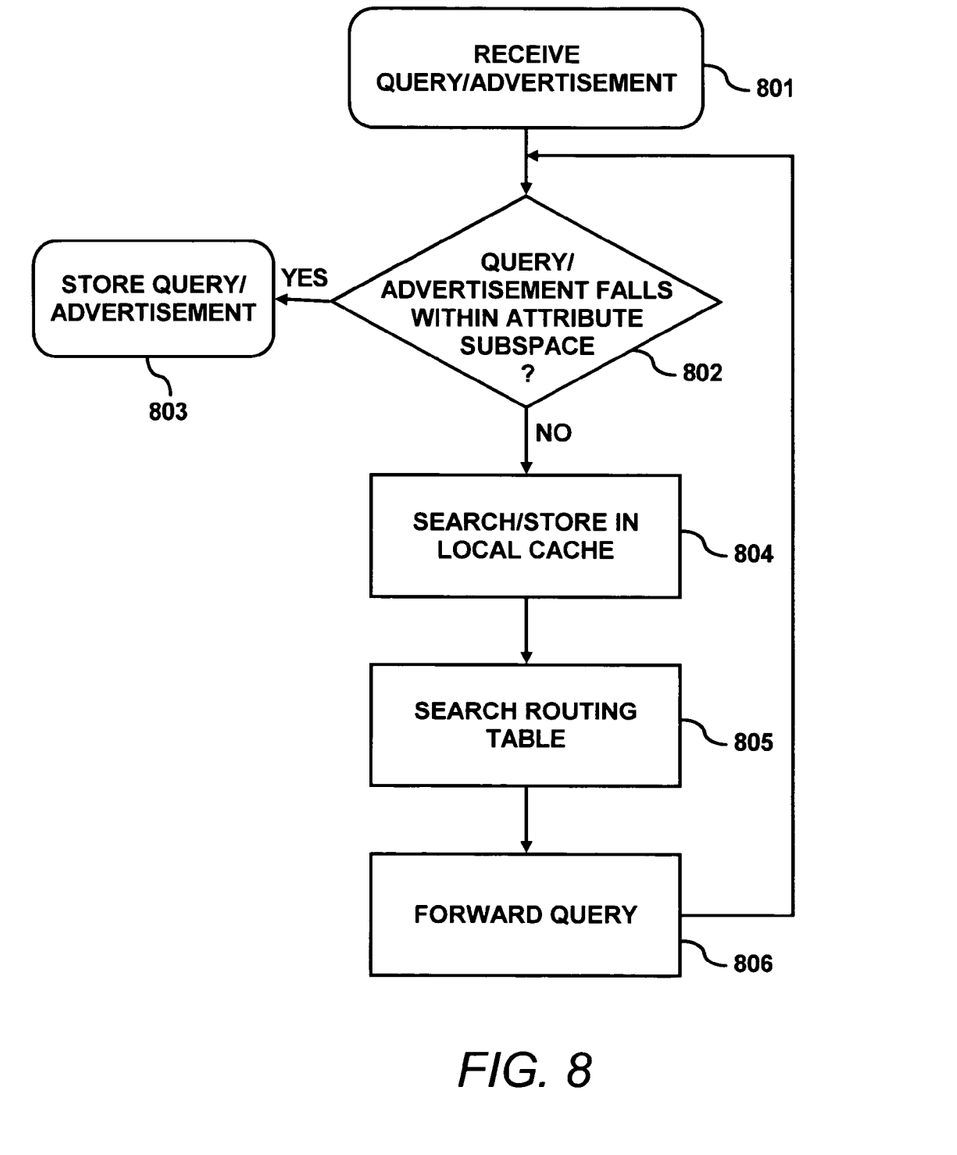
FIG. 8 illustrates a more detailed flow chart of a method for routing a query or advertisement, according to an embodiment.

FIG. 8 illustrates a more detailed method 800 for routing queries and advertisement in the overlay network 210, according to an embodiment. FIG. 8 is described with respect to the examples shown in FIGS. 5 and 6 by way of example and not limitation.

At step 801, an information service node receives a query or advertisement. At step 802, the information service node determines whether the query or advertisement falls within the attribute subspace of the information node. For example, in FIG. 5, the query 501 does not fall within the attribute subspace for the information service nodes 130a and 130b. Similarly, the advertisement 601 shown in FIG. 6 does not fall within the attribute subspace for the information service nodes 130a and 130b.

If the query or advertisement does not fall within the attribute subspace, the local cache, which may be included in the storage cache 410 shown in FIG. 4, is searched and/or used for storing the query or advertisement at step 804. For example, in FIG. 5 the local cache of the information service nodes 130a and 130b are searched to determine whether any advertisements in their local caches match the query 501. Matching advertisements may be transmitted to the user node 110a and the service node providing the service described in the matching advertisement. The query 501 is also stored in the local cache of the information service nodes 130c and 130d. In FIG. 6, the advertisement 601 is stored in the local caches of the information service nodes 130c and 130d.

At step 805, the routing table of the information service node is searched for an entry that includes an attribute range or value intersecting an attribute range or value of the query or advertisement. For example, the information service nodes 130a and 130b in FIG. 5 identify the entries 510 and 511 respectively. The routing table may be searched starting with the lowest level entry to identify the approximately closest information service node for forwarding the query 501. The query 501 is then routed to the information service node identified in the entry at step 806. The query 501 may be routed using Internet Protocol (IP) routing if the (IP) address is provided in the routing table entry. Similarly, with respect to FIG. 6, the information service nodes 130a and 130b identify the entries 610 and 611 respectively for routing the advertisement 601. The advertisement 601 is then routed to the information service node identified in the entry at each hop.

Step 802 is then repeated to determine whether the information service node receiving the query or advertisement owns the attribute subspace where the query or advertisement falls. At step 803, if the information service node receiving an advertisement owns the attribute subspace where the advertisement falls, the information service node stores the advertisement in its global cache, which may be included in the storage cache 410 shown in FIG. 4. Also at step 803, if the information service node receiving a query owns the attribute subspace where the query falls, the information service node stores the query and searches its global cache for any advertisements that match the query. If a match is found, the advertisement is transmitted to the node requesting the service and the service node providing the service. In addition, at step 803 the information service node may forward the query to other information service nodes having an attribute subspace where the query falls.

It will be apparent to one of ordinary skill in the art that one or more of the steps of the method 800 may be performed in a different order. For example, the step 804 of searching the local cache or storing information in the local cache may be performed prior to step 802.

Figure 9:
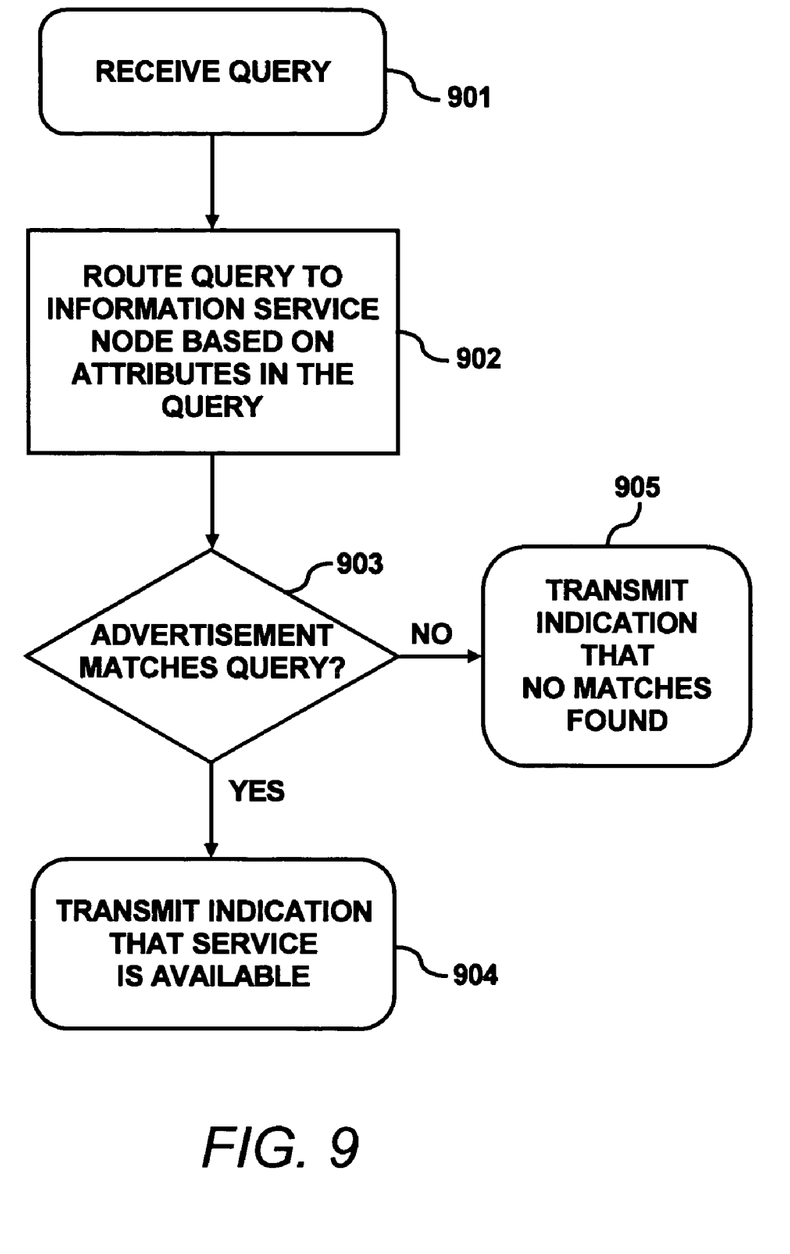
FIG. 9 illustrates a method for responding to a query transmitted to the information service, according to an embodiment.

FIG. 9 illustrates a method 900 for responding to a query transmitted to the information service, according to an embodiment. FIG. 9 is described with respect to the example shown in FIG. 5 by way of example and not limitation.

At step 901, an information service node in the information service, such as the information service node 130a shown in FIG. 5, receives the query 501. At step 902, the query 501 is routed to an information service node based on different attributes in the query 501. For example, the query 501 is routed to the information service node 130d owning the attribute subspace where the query falls. As also shown in FIG. 5, the query 501 is routed using at least two different attributes, such as the memory attribute and the response time attribute, to the information service node 130d because the query 501 includes attribute values that are included in the attribute values of the attribute subspace owned by the information service node 130d.

At step 903, the information service node 130d determines whether any advertisements stored in its global cache match the query 501. If a match is found, information associated with the advertisement which indicates that the service is available in the network 100 is transmitted to the user node 110a at step 904. The transmitted information may include the IP address of the service node providing the desired service. Also, the information service node 130d may transmit a message including the IP address of the user node 110a to the service node providing the desired service. If no matches are found at step 903, then the information service node 130d may transmit an indication that no matches are found at step 905, and the information service node 130d may forward the query to other information service nodes in the overlay network 210. For example, the query 501 may fall in the attribute subspace of another information service node and the query 501 is routed to that information service node via the overlay network 210.

Figure 10:
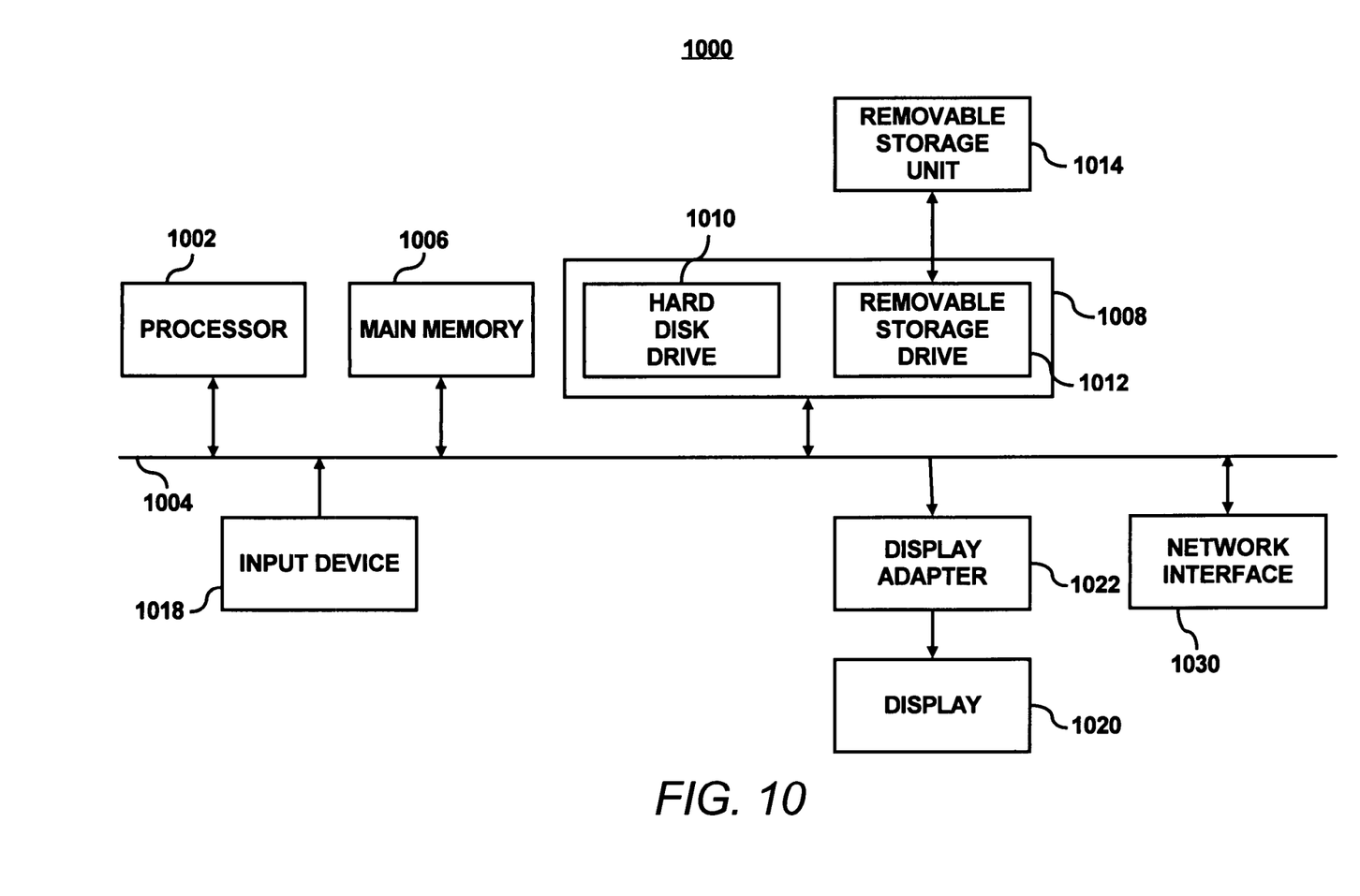
FIG. 10 illustrates a computer system, according to an embodiment.

FIG. 10 illustrates an exemplary block diagram of a computer system 1000 that may be used as an information service node in the overlay network 210. The computer system 1000 includes one or more processors, such as processor 1002, providing an execution platform for executing software.

Commands and data from the processor 1002 are communicated over a communication bus 1004. The computer system 1000 also includes a main memory 1006, such as a Random Access Memory (RAM), where software may be resident during runtime, and a secondary memory 1008. The secondary memory 1008 includes, for example, a hard disk drive 1010 and/or a removable storage drive 1012, representing a floppy diskette drive, a magnetic tape drive, a compact disk drive, etc., or a nonvolatile memory where a copy of the software may be stored. The secondary memory 1008 may also include ROM (read only memory), EPROM (erasable, programmable ROM), EEPROM (electrically erasable, programmable ROM). In addition to software, routing tables, the global information table, and measured QoS characteristics, measured available bandwidth and bandwidth required for services may be stored in the main memory 1006 and/or the secondary memory 1008. The removable storage drive 1012 reads from and/or writes to a removable storage unit 1014 in a well-known manner.

A user interfaces with the computer system 1000 with one or more input devices 1028, such as a keyboard, a mouse, a stylus, and the like. The display adaptor 1022 interfaces with the communication bus 1004 and the display 1020 and receives display data from the processor 1002 and converts the display data into display commands for the display 1020. A network interface 1030 is provided for communicating with other nodes via the network 1020 shown in FIG. 10.

One or more of the steps of the methods 700, 800 and 900 may be implemented as software embedded on a computer readable medium, such as the memory 1006 and/or 1008, and executed on the computer system 1000, for example, by the processor 1002. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of routing a service query in an overlay network, wherein nodes in the overlay network are operable to store information associated with attributes and attribute values for services, the method comprising:
   receiving a query including a plurality of attributes and attribute values describing a desired service;
   routing the query as a single query to a destination in the overlay network using different attributes in the query at different hops in the overlay network,
      wherein, at a first node, a first attribute value for a first attribute in the query is used to identify a second node as one of the hops, and at a second node, a second different attribute value for a second is attribute in the query is used to identify a third node as one of the hops;
   designating the destination to store advertisements describing a plurality or available services, wherein each of the plurality of available services has the same attributes and the same attribute values as the attributes and attribute values describing the desired service, and
   at the destination, determining whether the desired service is available from any advertisements stored at the destination.

2. The method of claim 1, wherein routing the query to a destination in the overlay network using the different attributes at different hops in the overlay network further comprises:
   searching entries in a routing table at the first node for an attribute range including the first attribute value for the first attribute in the query;
   identifying the second node from an entry in the routing table having an attribute range including the attribute value;
   transmitting the query to the second node in the overlay network;
   determining whether an attribute subspace for the second node includes attribute values in the query;
   searching entries in a routing table of the second node far an attribute range including the second different attribute value for the second attribute in the query;
   identifying the third node in the overlay network from an entry in the routing table of the second node having an attribute range including the attribute value of the second attribute in the query; and
   transmitting the query to the third node.

3. The method of claim 2, further comprising:
   determining whether an advertisement stored at the third node matches the query; and
   transmitting the advertisement to a node requesting a service described in the query.

4. The method of claim 2, wherein searching entries in a routing table at the first node for an attribute range including an attribute value for a first attribute in the query further comprises:
   searching the entries in the routing table at the first node starting with a lowest level entry.

5. The method of claim 1, wherein routing the query to the destination in the overlay network using the different attributes at different hops in the overlay network further comprises:
   transmitting the query to the first node in the overlay network.

6. The method of claim 5, wherein transmitting the query to the node in the overlay network further comprises:
   after identifying the second node, transmitting the query to the second node in the overlay network from the first node.

7. The method of claim 1, wherein each node in the overlay network is responsible for storing advertisements matching predetermined attribute values.

8. The method of claim 1, wherein the query comprises a range query including at least one range of attribute values and routing the query to a destination in the overlay network using different attributes in the query further comprises:
   routing the range query to a node in the overlay network having an attribute subspace including attribute values intersecting the at least one range.

9. The method of claim 1, wherein routing the query to a destination in the overlay network using different attributes in the query further comprises:
   routing the query to a plurality of nodes in the overlay network, each node of the plurality of nodes having an attribute subspace including at least one attribute value in the query.

10. The method of claim 9, wherein the query falls in the attribute subspaces of the plurality of nodes.

11. A method of routing a service advertisement in an overlay network, wherein the advertisement includes attributes and attribute values for a service, the method comprising:
   receiving an advertisement in the overlay network;
   routing the advertisement to a destination in the overlay network using different attributes in the advertisement and using different attribute values from the advertisement at different hops in the overlay network,
wherein, at a first node, a first attribute value for a first attribute in the advertisement is used to identify a second node as one of the hops, and at a second node, a second different attribute value for a second attribute in the advertisement is used to identify a third node as one of the hops; and
designating the destination to store advertisements for services described by at least some of the same attributes and attribute values.

12. The method of claim 11, wherein routing the advertisement to the destination in the overlay network using different attributes in the advertisement at different hops in the overlay network further comprises:
transmitting the advertisement to the first node in the overlay network.

13. The method of claim 12, routing the advertisement to the destination in the overlay network using different values in the advertisement at different hops in the overlay network further comprises:
and
after identifying the second node, transmitting the advertisement to the second node in the overlay network from the node.

14. The method of claim 13, wherein identifying a node using a first attribute in the advertisement further comprises:
searching entries, starting with a lowest level entry, in a routing table for an attribute range including an attribute value for the first attribute in the advertisement.

15. The method of claim 13, wherein each node in the overlay network is responsible for storing advertisements matching predetermined attribute values, and the second node is responsible for storing advertisements having the attribute values in the advertisement 16. The method of claim 11, wherein each node in the overlay network is responsible for an attribute subspace, and routing the advertisement to a destination in the overlay network using different attributes in the advertisement further comprises:
routing the advertisement to a destination in the overlay network including an attribute subspace having a range of attribute values intersecting a range of attribute values in the advertisement.

17. The method of claim 11, wherein routing the advertisement to a destination in the overlay network using different attributes in the advertisement further comprises:
routing and storing the advertisement in a plurality of nodes in the overlay network.

18. The method of claim 17, wherein the advertisement falls in an attribute subspace for each of the plurality of nodes.

19. A node in an overlay network, wherein each node in the overlay network is responsible for storing advertisements matching predetermined attribute values, the node comprising:
means for receiving an advertisement or a query;
routing table means for storing entries for other nodes in the overlay network;
means for searching the routing table means starting with a lowest level entry for a node in the overlay network responsible for a plurality of attribute value ranges, each range being for a different attribute, and the plurality of attribute value ranges include attribute Values in the advertisement or query; and
means for transmitting advertisement or query to the node in the overlay network responsible for the plurality of attributes value ranges,
wherein the advertisement or query is routed to the node in the overlay network responsible for the plurality of attribute value ranges using different attributes at different hops in the overlay network.

20. The node of claim 19, further comprising:
means for storing information associated with latency for replicas in the overlay network.

21. The node of claim 19, further comprising:
local cache means for storing advertisements and queries not in the attribute subspace for the node.

22. The node of claim 19, further comprising:
global cache means for storing advertisements and queries in the attribute subspace for the node.

23. A method comprising:
receiving a query including attributes and attribute values for a desired service at an information service node in a distributed information service;
routing the query to another information service node in the information service as a single query using different attributes in the query at different hops in an overlay network used for routing;
determining whether an advertisement for an available service, which is stored in the another information service node, includes attributes and attribute values matching the attributes and attribute values in the query; and
transmitting to a user node generating the query an indication that a service associated with the advertisement is available in response to the attributes and attribute values for the advertisement matching the attributes and attribute values in the query.

24. The method of claim 23, further comprising:
transmitting information associated with the user node to a service node providing the service described in the advertisement.

25. The method of claim 24, wherein this indication includes an address for the service node.

26. The method of claim 23, wherein the query falls in the attribute subspace of the another information service node.

* * * * *

UNITED STATES PATENT AND TRADEMARK OFFICE
CERTIFICATE OF CORRECTION

PATENT NO. : 7,529,196 B2  Page 1 of 1
APPLICATION NO. : 11/006041
DATED : May 5, 2009
INVENTOR(S) : Sujoy Basu et al.

It is certified that error appears in the above-identified patent and that said Letters Patent is hereby corrected as shown below:

In column 8, line 1, delete "110ajoins" and insert -- 110a joins --, therefor.

In column 8, line 36, delete "130i a" and insert -- 130a --, therefor.

In column 9, line 7, delete "110ais" and insert -- 110a is --, therefor.

In column 13, line 52, in Claim 1, delete "and" and insert -- and, --, therefor.

In column 13, line 53, in Claim 1, after "second" delete "is".

In column 13, line 57, in Claim 1, delete "or" and insert -- of --, therefor.

In column 14, line 11, in Claim 2, delete "far" and insert -- for --, therefor.

In column 15, line 5, in Claim 11, delete "and" and insert -- and, --, therefor.

In column 15, line 22, in Claim 13, delete "and".

In column 16, line 8, in Claim 19, delete "Values" and insert -- values --, therefor.

In column 16, line 10, in Claim 19, after "transmitting" insert -- the --.

In column 16, line 50, in Claim 25, delete "this" and insert -- the --, therefor.

Signed and Sealed this

Eighth Day of December, 2009

David J. Kappos
*Director of the United States Patent and Trademark Office*